UNITED STATES PATENT OFFICE.

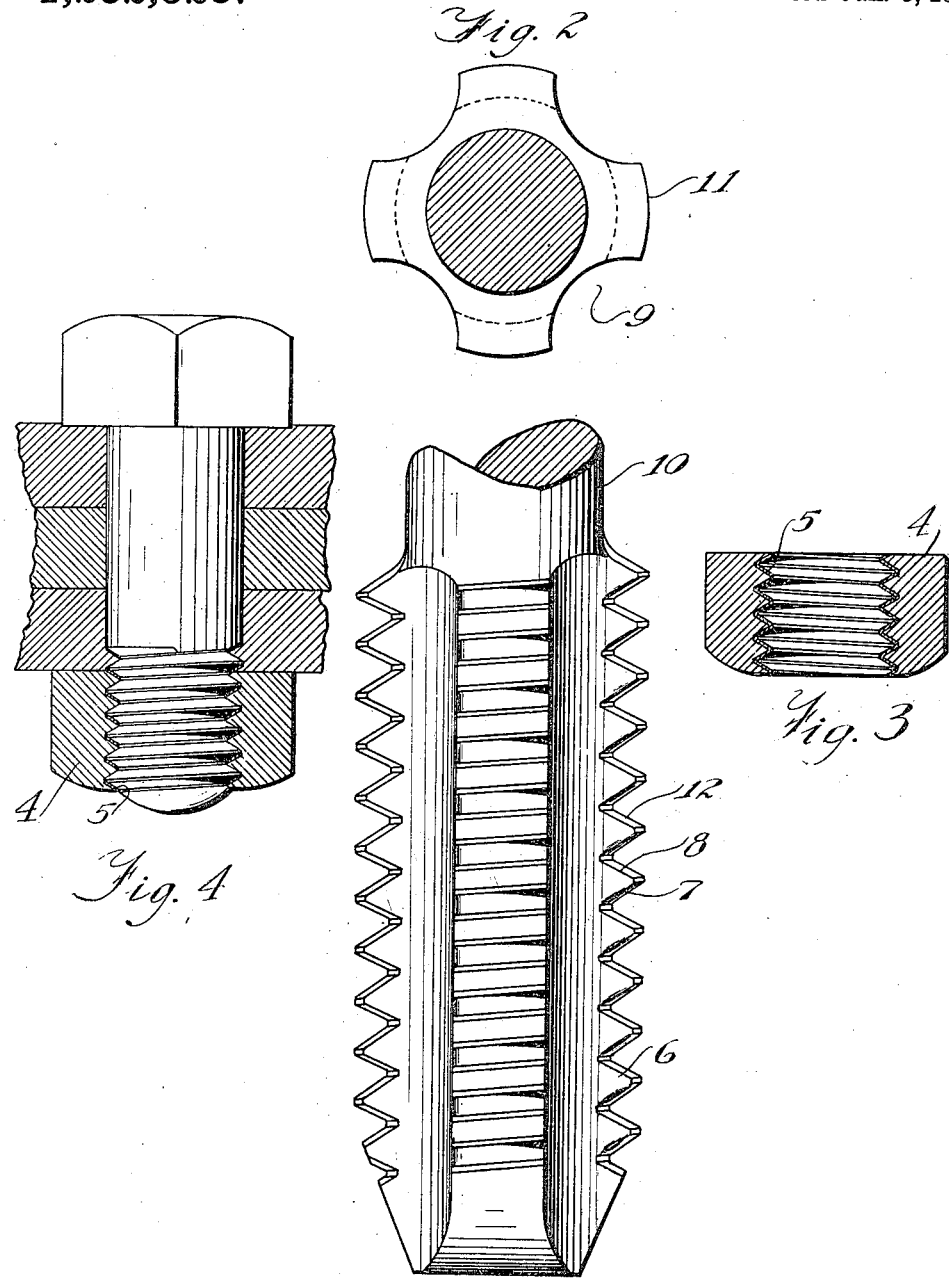

IRVING C. WOODWARD, OF CHICAGO, ILLINOIS, ASSIGNOR TO HOLDFAST NUT & BOLT COMPANY, OF CHICAGO, ILLINOIS, A CORPORATION OF ILLINOIS.

RETAPPING-TOOL.

1,252,525.                Specification of Letters Patent.        Patented Jan. 8, 1918.

Application filed December 21, 1916. Serial No. 138,166.

*To all whom it may concern:*

Be it known that I, IRVING C. WOODWARD, a citizen of the United States of America, and a resident of Chicago, county of Cook, and State of Illinois, have invented certain new and useful Improvements in Retapping-Tools, of which the following is a specification.

This invention relates particularly to retapping tools of the type mentioned in applicant's Patent No. 1,175,034, nut-lock, but may be also applied to thread cutting dies, as well as to taps.

The main object of the invention is to provide a tap or die which is capable of removing a coating of metal from one side only of the thread of a nut or bolt.

An illustrative embodiment of this invention is shown in the accompanying drawings, in which—

Figure 1 shows in front elevation a tap constructed according to this invention.

Fig. 2 is a sectional view of the tap.

Fig. 3 shows in section the type of article operated upon by the tool, such article being provided with a thread coated with a soft metal or binding material.

Fig. 4 shows in section the finished article after being operated upon by the retapping tool and as applied to a bolt.

The above-mentioned patent describes a standard form of bolt or nut having a thread of usual form and dimensions, but to which has been uniformly applied a coating of soft metal for the purpose of causing the nut to be bound to or firmly grip the bolt. In order that the nut may be easily screwed onto the bolt and that the threads thereof may be of approximately standard size, the coating of soft material is removed from one side of the thread. This arrangement brings about the further advantage that the faces of the two coacting threads which are normally under strain are in direct surface contact, without having a layer of soft material between them.

The drawings show a nut 4 which may be made from steel and the threads of which are coated with a softer metal 5. This coating of softer metal may be deposited on the thread by dipping the nut in a molten composition of tin, lead, zinc, or other soft metal. The coating is then removed from one side of the thread by a retapping tool 6. This tap in general appearance is like well-known forms of threading taps in which are a plurality of longitudinal recesses 9 cut in the shank 10, and rows of projecting teeth 11 between the recesses 9, the teeth of the tool being arranged in a helix around its axis. The advance edges or ends 12 of each tooth are rounded, beveled, or otherwise dulled on the side 7, while the side 8 is permitted to remain sharp as in an ordinary tap. By reason of this formation of the teeth, when the retapping tool is rotated through a nut which has previously been threaded and coated, the rounded edges 7 cause the teeth of the tap to ride over the soft metal coating on one side of the threads of the nut without removing it, while the sharp edges 8 remove the soft metal from the opposite or load bearing surface of the threads of the nut.

The same type of tooth as employed in the above mentioned tap may be formed in thread cutting dies and also for the same purpose of removing a soft metal from one side of the threads of bolts.

I claim:

1. A tool of the class described, comprising a body portion provided with a plurality of projecting teeth arranged in a helical line around the axis of said body portion, said teeth having all their advance edges on the same side of non-cutting formation and on the other side sharp, for the purpose of cutting on one side only.

2. A retapping tool of the class described, comprising a shank having a plurality of projecting teeth arranged in a helical line around said shank, said teeth having their advance edges on one side rounded or dulled and on the other side sharp, for the purpose of cutting on one side only.

Signed at Chicago this 18th day of December 1916.

IRVING C. WOODWARD.

Copies of this patent may be obtained for five cents each, by addressing the "Commissioner of Patents, Washington, D. C."